United States Patent
Robinson et al.

(10) Patent No.: US 10,934,385 B1
(45) Date of Patent: *Mar. 2, 2021

(54) POLYURETHANE ELASTOMERS, BIO-ADDITIVE FOAM COMPOSITIONS

(71) Applicant: Evoco Ltd., Toronto (CA)

(72) Inventors: Jason James Robinson, Toronto (CA); Mustafa Abu Ghalia, Toronto (CA); Syed Muhammad Husainie, Etobicoke (CA)

(73) Assignee: Evoco Ltd., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,808

(22) Filed: Sep. 9, 2020

(51) Int. Cl.
*C08G 18/42* (2006.01)
*C08G 18/32* (2006.01)
*C08G 18/66* (2006.01)
*C08G 18/76* (2006.01)
*C08K 5/11* (2006.01)
*C08K 5/00* (2006.01)

(52) U.S. Cl.
CPC ..... *C08G 18/4238* (2013.01); *C08G 18/3206* (2013.01); *C08G 18/664* (2013.01); *C08G 18/7671* (2013.01); *C08K 5/0041* (2013.01); *C08K 5/11* (2013.01); *C08G 2110/0066* (2021.01)

(58) Field of Classification Search
CPC ............ C08G 18/4236; C08G 18/4238; C08G 18/7671
See application file for complete search history.

(56) References Cited

U.S. PATENT DOCUMENTS

| | | | | | |
|---|---|---|---|---|---|
| 2010/0112333 | A1* | 5/2010 | Cameron | ................ | C08G 18/10 428/315.5 |
| 2010/0239803 | A1* | 9/2010 | Farkas | .................... | B29C 48/78 428/36.9 |
| 2011/0166316 | A1* | 7/2011 | Duwenhorst | ...... | C08G 18/4238 528/74.5 |
| 2011/0306734 | A1* | 12/2011 | Brauer | .................. | C08G 18/10 525/440.08 |
| 2013/0210950 | A1* | 8/2013 | Nefzger | ............. | C08G 18/4202 521/170 |

FOREIGN PATENT DOCUMENTS

JP 2006182874 A * 7/2006

OTHER PUBLICATIONS

Machine Translation of JP2006-182874A. Jul. 13, 2006. (Year: 2006).*
Szycher, M. Szycher's Handbook of Polyurethanes: Second Edition. CRC Press, Taylor & Francis Group, LLC. 2013. pp. 547-585. (Year: 2013).*
Ionescu, M. Chemistry and Technology of Polyols for Polyurethanes. Rapra Technology Limited. 2005. pp. 263-294. (Year: 2005).*
Foam Specifications Explained. Ultralon Products (NZ) Ltd. Retrieved Oct. 27, 2020. (Year: 2020).*

* cited by examiner

*Primary Examiner* — Stephen E Rieth
(74) *Attorney, Agent, or Firm* — Eugene O. Palazzo

(57) ABSTRACT

A polyurethane elastomer composition of (a) an organic diisocyanate, (b) a polyester resin; (c) a chain extender comprised of a polyhydric alcohol, (d) a crosslinker, (e) a plasticizer, (f) a surfactant, (g) a blowing or foaming agent, and (h) an optional dye; and where the elastomer has, for example, a hardness value of, for example, from about 20 Asker C to about 60 Asker C, a tensile strength of, for example, from about 1 MPa to about 10 MPa, a resilience of, for example, from about 30 percent to about 60 percent, an elongation at break of from about 150 percent to about 700 percent, and a tear strength of, for example, from about 2 Newtons/millimeters$^2$ to about 4 Newtons/millimeters$^2$.

22 Claims, No Drawings

POLYURETHANE ELASTOMERS, BIO-ADDITIVE FOAM COMPOSITIONS

This disclosure is generally directed to polyurethane elastomer compositions which can be generated from the reaction of (a) an organic diisocyanate, (b) a polyester resin, (c) a chain extender, (d) a crosslinker, (e) a plasticizer, (f) a surfactant, (g) an optional foaming agent, and (h) an optional dye, and which compositions can be selected for a number of articles, such as footwear, insoles, middle soles, shoes, boots, sneakers, slippers, clothing, insulation, automobile components, furniture components like coverings, bedding, seals, molded flexible parts, foams, adhesives, and medical devices, and as a replacement for a number of known polyurethane elastomers.

RELATED APPLICATION

In copending patent application, U.S. application Ser. No. 17/015,669 and concurrently electronically filed with the United States Patent Office, on Sep. 9, 2020 there is illustrated polyurethane elastomers, foam compositions, and processes thereof, the disclosure of this copending application being totally incorporated herein by reference.

BACKGROUND

In United States Patent Publication 2012/0258269 A1 there is disclosed a process for preparing polyester polyols from at least one carboxylic acid recovered from natural raw materials, and having at least two acid groups, at least one polyhydric alcohol, at least one organic phosphite group, and at least one Lewis acid. The recited polyol polyester composition according to this publication can be selected to prepare various thermoplastic polyurethane products.

U.S. Pat. No. 9,458,277 discloses a method for the preparation of polyurethane elastomers based on polyester diols formed from diacids, such as succinic acid, a carbohydrate, diols such as 1,3-propanediol, and an organic diisocyanate.

Also, in United States Patent Publication 2013/0035448 there is disclosed a method for producing a biomass resource-derived polyurethane by reacting a dicarboxylic acid and an aliphatic diol to produce a polyester polyol and reacting the polyester polyol and a polyisocyanate compound, where the dicarboxylic acid contains at least one component derived from biomass resources, a content of an organic acid in the dicarboxylic acid is more than 0 ppm and not more than 1,000 ppm relative to the dicarboxylic acid, and a pKa value of the organic acid at 25° C. is not more than 3.7.

Athletic shoes, whether for running or engaging in sports activities, lose massive amounts of energy due to impact and shock, especially in the midsoles. A well cushioned shoe disperses the impact and shock that for a period of time keeps the feet comfortable and prevents the feet from hurting. High performance athletic shoes have well cushioned midsoles that transfer the impact into forward motion or lift-offspring-like effect, as if the impact/shock is being turned into a return energy.

Thus, a number of polyurethane elastomers are known, many of which possess deficiencies such as insufficient life times, poor hardness, degradation, unsuitable and consistent properties like tensile strengths, discoloration, lack of continued suitable flexibilities, complex and costly preparation processes, including the absence of components, such as phosphites, and the absence of polyesters like the disclosed amorphous polyester resins and semi-crystalline polyester resins in combination with other components, and excellent and in embodiments, improved bio-contents.

There is a need for polyurethane elastomers that can be selected for molded flexible parts, footwear insoles or midsoles, and which elastomers with, for example, a combination of specific mechanical properties, such as a hardness of, for example, from about 20 to about 60 Asker C, from about 15 to about 60 Askar C, from about 20 to about 50 Asker C, and from about 15 to about 35 Askar C, and for insoles a hardness of, for example, from about 22 Asker C to about 44 Asker C, and for midsoles a hardness of from about 40 to about 60 Asker C, and containing, for example, an amorphous polyester or a semi-crystalline polyester with excellent melting points.

Yet also, there is a need for polyurethane elastomer foams and processes wherein there are selected surfactants, plasticizers, dyes, crosslinkers, chain extenders, plasticizers and blowing, or foaming agents.

Further, there is a need for polyurethane (PU foams) that have an excellent density, prolonged Asker C hardness, improved tensile strengths, acceptable and consistent elongation and tear strength properties, and which foams are, for example, selected for shoes and similar footwear that contain insoles and midsoles.

Another need resides in the generation of polyurethane elastomers where there is eliminated a number of semi-crystalline polyester polyols that must be heated above 50° C. prior to permitting the initiation of foaming, and which polyols increase preheating time, create a highly viscous liquid difficult to use in manufacturing methods, and where elevated temperatures increase the reaction kinetics and cause less control over the reaction thereby adversely affect product quality.

Additionally, there is a need for polyurethane elastomer foams where the viscosities of the polyol ester reactant may be decreased with the use of certain plasticizers.

There is a need for footwear like athletic shoes with superior energy return, that is the ability of footwear, such as athletic shoes to receive and release energy upon impact on striking the ground and resilience, which is the ability to spring back into its original shape (elasticity) after being compressed and measured by the rebound percentage, and where in embodiments the disclosed polyurethane foam-based midsoles have, for example, a return energy of from about 50 percent to about 100 percent, from about 55 to about 75 percent, and from about 55 and from about 70 as measured by VF Corporation with their proprietary equipment, hydrolytic stability, excellent resilience of, for example, from about 25 percent to about 60 percent, from about 30 percent to about 60 percent, from about 25 percent to about 45 percent, and improved compression sets.

Yet in embodiments, there is a need for polyurethane elastomer foams selected for insoles and midsoles that have excellent mechanical properties, and where the insoles have a density (grams/centimeter$^3$) of, for example, from about 0.2 to about 0.3; a hardness (Asker C) of, for example, from about 15 to about 55; an elongation of, for example, from about 150 percent to about 700 percent, from about 450 percent to about 650 percent; a tensile strength of, for example, equal to or greater than about 20 MPa; a tear strength of, for example, equal to or greater than about 2 Newtons/millimeters$^2$, a rebound test resilience of, for example, equal to or from about 40 to about 50 percent; a compression set, for example, of equal to or less than about 6 percent; and a hydrolytic stability of, for example, equal to or at least 80 percent; and for midsoles a density in grams/ centimeters$^3$ of, for example, equal to or less than 0.5; a hardness (Asker C) of, for example, from about 30 to about 50; an elongation of equal to or greater than about 300 percent; a tensile strength in MPa of, for example, equal to or greater than about 10; a tear strength in Newtons/millimeters of, for example, equal to or greater than about 3; a rebound test resilience of, for example, equal to or greater than about 60; a compression set of, for example, less than or equal to about 20 percent; an abrasion of, for example, less than or equal to about 300 percent; and a hydrolytic stability of, for example, equal to or at least 80 percent.

Also, therefore there is a need for insoles with a density (grams/centimeters$^3$) of from about 0.2 to about 0.3; a hardness (Asker C) of about 15 to about 35; an excellent elongation of from about 450 to about 650 percent; a tensile strength (MPa) of less than about 20; a tear strength (Newtons/millimeters) of less than about 2; a rebound test resilience of from about 40 to about 45 percent; a compression set of greater than about 6 percent; and a hydrolytic stability of about 80 percent and above; and for midsoles, a density (grams/centimeters$^3$) of greater than about 0.5; a hardness (Asker C) of from about 30 to about 50; an excellent elongation, a tensile strength (MPa) of less than about 10; a tear strength (Newtons/millimeters) of less than about 3; a rebound test resilience of less than about 60 percent; a compression set of less than about 20 percent; an excellent and improved abrasion or hardness of more than about 300 percent; and a hydrolytic stability of about 80 percent and above.

An important need resides in polyurethane elastomer foams with a bio-content of, for example, from about 50 to about 90, from about 60 to about 90 percent, from about 60 percent to about 75 percent, from about 50 percent to about 90 percent, from about 40 percent to about 85 percent, from about 70 percent to about 85 percent, and from about 60 percent to about 80 percent.

These and other needs may be accomplished with the disclosed polyurethane elastomers and foams thereof of the present disclosure.

SUMMARY

Disclosed herein are polyurethane elastomer compositions generated, for example, from the reaction of (a) an organic diisocyanate, (b) a polyester resin, (c) a chain extender comprised of a polyhydric alcohol, (d) a crosslinker, (e) a plasticizer, (f) a surfactant, (g) an optional foaming agent, and (h) an optional colorant such as a dye, and wherein said elastomer has a hardness value of from about 15 or 20 Asker C to about 60 Asker C, a tensile strength of from about 1 MPa to about 10 MPa, a tensile strength of from about 1 MPa to about 5 MPa, a resilience of from about 25 percent to about 60 percent, an elongation at break of from about 150 percent to 700 percent, and a tear strength of from about 2 Newtons/millimeters$^2$ to about 4 Newtons/millimeters$^2$.

Also disclosed is an article comprised of a polyurethane elastomer, such as in the configuration of a foam generated from the reaction of (a) an organic diisocyanate, (b) a polyester resin, (c) a chain extender comprised of a polyhydric alcohol, (d) a crosslinker, (e) a plasticizer, (f) a surfactant, (g) a foaming agent, and (h) a colorant such as a pigment, a dye, or mixtures thereof, and wherein the elastomer has a hardness value of, for example, from about 15 Asker C to about 60 Asker C, a tensile strength of from about 1 MPa to about 10 MPa, a resilience of from about 30 percent to about 60 percent, an elongation at break of from about 150 percent to 700 percent, and a tear strength of from about 2 Newtons/millimeters$^2$ to about 4 Newtons/millimeters$^2$.

Moreover, disclosed is a process for the preparation of a polyurethane elastomer composition comprising mixing, and then reacting (a) an organic diisocyanate, (b) a polyester resin derived from an organic diacid and an organic diol, (c) a chain extender comprised of a polyhydric alcohol, (d) a crosslinker, (e) a plasticizer, (f) a surfactant, (g) a foaming agent, (h) a dye, and (i) a catalyst, and wherein the elastomer has a hardness of from about 20 Asker C to about 60 Asker C, a tear strength of from about 2 to about 4 Newtons/millimeters$^2$, a resilience of from about 25 percent to about 45 percent, and a compression set of from about 3 percent to about 6 percent.

Yet additionally, there is disclosed a polyurethane elastomer foam composition prepared by the reaction of an organic diisocyanate, an amorphous polyester resin or a semi-crystalline polyester resin with a melting point of less than about 70° C., a chain extender comprised of a polyhydric alcohol, a crosslinker, a plasticizer, a dye, a surfactant, and a foaming agent, and wherein the elastomer has a hardness of from about 15 Asker C to about 60 Asker C, and/or from about 20 to about 60 Asker C, a tensile strength of from about 1 to about 10 MPa, and an elongation at break of from about 150 percent to about 700 percent, and which elastomers can be, for example, selected for shoe articles comprised of an insole and a midsole.

Further, in embodiments there is disclosed a polyurethane elastomer foam composition and processes thereof, and more specifically, a polyurethane elastomer foam composition that can be selected for footwear, such as shoe articles comprised of an insole, a midsole, or both the insole and midsole and the other uses disclosed herein. More specifically, there is disclosed a polyurethane elastomer derived from (a) an organic diisocyanate, (b) an amorphous polyester or semi-crystalline polyester resin derived from an organic diacid and organic diol polyester polyol, (c) a chain extender comprised of a polyhydric alcohol, (d) a crosslinker, (e) a plasticizer, (f) a surfactant, (h) a foaming component, such as water, and wherein the elastomer has a hardness of from about 30 to about 60 Asker C, a tensile strength of from about 1 to about 5 MPa, and an elongation at break of from about 250 percent to about 625 percent.

Furthermore, there are disclosed amorphous polyester polyols with melting points of less than about 5° C. to less than about 25° C., and more specifically, an amorphous polyester resin with no or zero melting point and a glass transition temperature of less than about −10° C., like from about −2° C. to about −8° C. Also, other properties for the amorphous polyester include weight average molecular weights as determined, for example, by known techniques like Gel Permeation Chromatography (GPC) of from about 700 Daltons to 4,000 Daltons, hydroxyl values of from about 35 to about 65, and acid numbers of less than about 5 milligrams/grams of KOH, and more specifically, from about 0.5 to about 1 milligram/gram of KOH. These polyols can be subsequently used to prepare polyurethane foams for the footwear industry and the automobile industry.

There are also disclosed polyurethane elastomers and polyurethane foam compositions comprised of from about 40 to about 55 percent by weight of a polyol polyester, from about 1 to about 3 percent by weight of a chain extender, from about 1 to about 7 percent by weight of a crosslinker, from about 8 to about 15 percent by weight of a plasticizer, from about 0.2 to about 0.5 percent by weight of a surfactant, from about 0.5 percent by weight to about 3 percent by weight of a chain extender, from about 0.1 percent by weight to about 0.5 percent by weight of a catalyst, from about 0.1 percent by weight to about 3 percent by weight of foaming agent, from about 0.5 percent by weight to about 5 percent by weight of colorant of, for example, a dye, a pigment, or mixtures thereof, and with from about 10 percent by weight to about 25 percent by weight of an organic diisocyanate where all the percents by weight disclosed are equal to 100 weight percent.

Moreover, there are disclosed processes for the preparation of a polyurethane elastomer foam comprised of contacting a homogenized mixture of from about 40 to about 60 parts of a polyester polyol, from about 8 percent by weight to about 20 percent by weight of a plasticizer, from about 0.5 to about 0.5 percent by weight of surfactant, from about 0.5 to about 2 parts of chain extender, from about 0.1 to about 0.6 part of a catalyst, from about 0.1 part to about 5 parts of a foaming agent of water, from about 0.1 to about 5 parts of crosslinker, from about 0.3 to about 5 parts of dye, with from about 9 parts to about 15 parts of diisocyanate.

In addition, the following disclosures are provided:

The disclosed polyurethane elastomer compositions can be prepared from (i) a first mixture comprised of an amorphous or semi-crystalline polyester polyol resin, plasticizer, surfactant, chain extender, crosslinker, catalyst, optional foaming agent like water, and a dye, and contacting this mixture with a diisocyanate. Polyurethane foams are generated by the reaction between, for example, the polyester polyol, and isocyanate as the main reactive ingredients, chain extender, crosslinker and water, and wherein the plasticizer, surfactant, water and dye are additives, or mostly non-reactant components to render the elastomer into a foam.

In one production process embodiment, the polyurethane elastomers can be prepared using a multistage process comprising soft-segment pre-extensions, where A) one or more substantially linear polyester diols with functionality of from about 1.8 to about 2.2 are reacted with a portion, such as one part of an organic diisocyanate or a plurality of organic diisocyanatos in a molar NCO:OH ratio of from 1.1:1 to 3.5:1, and from about 1.3:1 to about 2.5:1 to provide a relatively high-molecular-weight isocyanate-terminated prepolymer ("NCO prepolymer"); B) the prepolymer obtained in stage A) is blended with a portion 2 of the organic diisocyanate or of the plurality of organic diisocyanatos, where the entirety of portion 1 and portion 2 corresponds to the entire amount of diisocyanatos used; C) the mixture obtained in stage B) is reacted with one or more diol chain extenders with, for example, weight average molecular weights of from about 60 to about 350, where the molar NCO:OH ratio resulting from the components used in A), B), and C) is at, for example, from about 0.9:1 to about 1.1:1, and where the substantially linear polyester diols in stage A) are comprised of succinic acid and 1,3-propanediol, and have an optional average molar mass of from about 750 to about 3,500 grams/mol.

In embodiments, the disclosed polyurethane elastomers, which in embodiments are biodegradable, can be derived from the reaction of a polyester polyol of from about 45 to about 55 percent by weight, a chain extender of from about 0.1 to about 2 percent by weight, a crosslinker of from about 1 to about 5 percent by weight, a foaming agent of from about 0.1 to about 2 percent by weight, and a diisocyanate of from about 40 to about 50 percent by weight, and wherein the total thereof is 100 percent by weight. Polyurethane foams are generated by the reaction between, for example, the polyester polyol, and isocyanate as the main reactive ingredients, chain extender, crosslinker, and wherein the plasticizer, surfactant, water and colorant like a dye may be considered as being non-reactive.

EMBODIMENTS

Disclosed are polyurethane elastomer compositions comprising (a) an organic diisocyanate, (b) a polyester resin, (c) a chain extender, (d) a crosslinker, (e) a plasticizer, (f) a surfactant, (g) an optional foaming agent, and (h) an optional colorant; and wherein said elastomer has a hardness value of from about 20 Asker C to about 60 Asker C, a tensile strength of from about 1 MPa to about 10 MPa, and a tensile strength of from about 1 MPa to about 5 MPa, a resilience of from about 25 percent to about 60 percent, an elongation at break of from about 150 percent to about at least 700 percent, and a tear strength of from about 2 Newtons/millimeters$^2$ to about 4 Newtons/millimeters$^2$.

Polyesters

The disclosed amorphous and semi-crystalline polyester polyol resins can be prepared by a polycondensation process by reacting suitable organic diols and suitable organic diacids in the presence of polycondensation catalysts. Generally, a stoichiometric equimolar ratio of organic diol and organic diacid is utilized, however, an excess of organic diol can be selected such that the resulting polymer displays a hydroxyl number of from about 30 to about 40, an acid number of less than about 5 milligrams/gram of KOH, and more specifically, less than about 3 milligrams/gram of KOH, and with a molecular weight average of from about 1,500 to about 5,000 Daltons as determined by GPC. In some instances, where the boiling point of the organic diol is from, for example, about 180° C. to about 230° C., an excess amount of diol, such as an alkylene glycol of, for example, ethylene glycol or propylene glycol of from about 0.2 to 1 mole equivalent, can be utilized and removed during the polycondensation process by distillation. The amount of catalyst utilized varies, and can be selected in amounts as disclosed herein, and more specifically, for example, from about 0.01 percent by weight to about 1 percent by weight, or from about 0.1 to about 0.75 percent by weight based on the polyester resin.

Examples of organic diacids or diesters, which can also be those obtained through fermentation process, natural sources like chemically derived from natural (bio-based) sources, selected for the preparation of the amorphous polyester resins and the semi-crystalline polyester resins include fumaric, maleic, oxalic acid, succinic acid, fumaric acid, itaconic acid, glutaric acid, adipic acid, suberic acid, azelaic acid, sebacic acid, 1,12-dodecanedioic acid, C-18 dimer acids, or dimerized fatty acids of dicarboxylic acids prepared by dimerizing unsaturated fatty acids obtained from tall oil, usually on clay catalysts; hydrogenated/saturated dimer acids, and other known suitable organic diacids, and the like; 1,16-octadecanedioic acid, phthalic acid, isophthalic acid, terephthalic acid, naphthalene-2,6-dicarboxylic acid, naphathalene-2,7-dicarboxylic acid, cyclohexane dicarboxylic acid, malonic acid and mesaconic acid, and diesters or anhydrides thereof, and other suitable known diacids. The organic diacid is selected in an amount of, for example, from about, 35 to about 60 percent by weight, and from about 45 to about 50 percent by weight of the polyester resin.

The organic diol reactant selected, which can also be obtained from biomasses generated through fermentation process, natural sources, and chemically derived from natural sources, includes 1,5-pentanediol, 1,2-propanediol(1,2-propylene glycol), 1,3-propanediol, 1,4-butanediol, 1,10- decanediol, 1,9-nonanediol, dimer diols, which include aliphatic dimer diols with, for example, from about 2 carbon atoms to about 36 carbon atoms, includes PRIPOL® 2033 dimer diols, commercially available from Croda International PLc, and other known suitable organic diols.

Aliphatic diol reactant examples with, for example, from about 2 carbon atoms to about 36 carbon atoms, include 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl-1,3-propanediol, alkylene glycols like ethylene glycol, propylene glycol, monoethylene glycol, diethylene glycol, monopropylene glycol, dipropylene glycol, isosorbide, mixtures thereof, and the like. The organic diol is selected, for example, in an amount of from about 45 percent to about 65 percent, and from about 50 percent by weight to about 55 percent by weight of the polyester resin.

In embodiments of the present disclosure, examples of specific dimer diols and dimer diacids enabling enhanced hydrophobic characteristics, and thus excellent hydrolytically stable characteristics for the polyesters, include as dimer acids PRIPOL® 1013, PRIPOL® 1017, PRIPOL® 1009, and PRIPOL® 1012, and as dimer diols PRIPOL® 2033 and PRIPOL® 2043.

Polycondensation catalysts utilized for the preparation of crystalline and amorphous polyesters or the bio-based catalysts thereof include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), or mixtures thereof, and other known suitable catalysts; and which catalysts are selected in amounts of, for example, from about 0.01 percent by weight to about 5 percent by weight, from about 0.1 to about 0.8 percent by weight, and from about 0.2 to about 0.6 percent by weight, based on the starting diacid or diester used to generate the polyester resins, and other suitable known catalysts.

Examples of semi-crystalline polyesters, amorphous polyesters, and mixtures thereof, and in some instances where the semi-crystalline polyesters can be converted to an amorphous polyester by altering the amount of the comonomers of the amorphous polyester in the reaction mixture, are as illustrated herein, and other known suitable polyesters.

Examples of semi-crystalline polyester resins with, for example, a melting point range of equal to or less than, for example, about 60° C. include those resins derived from straight chain aliphatic organic diacids, such as succinic acid, glutaric acid, adipic acid, suberic acid, azelaic acid, sebacic acid, 1,12-dodecane dioic acid, and straight chain aliphatic organic diols, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, and 1,12-dodecanediol, include poly(1,2-ethylene-succinate), poly(1,2-ethylene-adipate), poly(1,2-ethylene-sebacate), poly(1,2-ethylene-decanoate), poly(1,2-ethylene-nonoate), poly(1,2-ethylene-dodeanoate), poly(1,2-ethylene-azeleoate), poly(1,3-propylene-succinate), poly(1,3-propylene-adipate), poly(1,3-propylene-sebacate), poly(1,3-propylene-decanoate), poly(1,3-propylene-nonoate), poly(1,3-propylene-dodeanoate), poly(1,3-propylene-azeleoate), poly(1,4-butylene-succinate), poly(1,4-butylene-adipate), poly(1,4-butylene-sebacate), poly(1,4-butylene-decanoate), poly(1,4-butylene-nonoate), poly(1,4-butylene-dodeanoate), poly(1,4-butylene-azeleoate), poly(1,6-hexylene-succinate), poly(1,6-hexylene-adipate), poly(1,6-hexylene-sebacate), poly(1,6-hexylene-decanoate), poly(1,6-hexylene-nonoate), poly(1,6-hexylene-dodeanoate), poly(1,6-hexylene-azeleoate), poly(1,8-octylene-succinate), poly(1,8-octylene-adipate), poly(1,8-octylene-sebacate), poly(1,8-octylene-decanoate), poly(1,8-octylene-nonoate), poly(1,8-octylene-dodeanoate), poly(1,8-octylene-azeleoate), poly(1,9-nonylene-succinate), poly(1,9-nonylene-adipate), poly(1,9-nonylene-sebacate), poly(1,9-nonylene-decanoate), poly(1,9-nonylene-nonoate), poly(1,9-nonylene-dodeanoate), poly(1,9-nonylene-azeleoate), poly(1,10-decylene-succinate), poly(1,10-decylene-adipate), poly(1,10-decylene-sebacate), poly(1,10-decylene-decanoate), poly(1,10-decylene-nonoate), poly(1,10-decylene-dodeanoate), poly(1,10-decylene-azeleoate, mixtures thereof, other suitable known polyesters and the like.

The semi-crystalline polyester resins with melting points of less than from about 70° C., and more specifically, from about 40° C. to about 60° C., and less than about 50° C., such as from about 15° C. to about 49° C., can be prepared from a mixture of at least one straight chain aliphatic organic diacid, at least one straight chain aliphatic diol, and a branched aliphatic diol, such as 1,2-propanediol, 1,3-butanediol, 2,3-butanediol, 3,3-dimethyl pentanediol; 1,5-pentanediol, mixtures thereof, and the like. The organic diacid of at least one aliphatic straight chain organic diacid is selected in an amount of, for example, from about 45 to about 50 percent by weight of the polyester resin. The straight chain aliphatic diol is selected in an amount of, for example, from about 20 to about 40 percent by weight of the polyester resin, and the branched aliphatic diol is selected in an amount of, for example, from about 20 percent by weight to about 40 percent by weight of the polyester resin. These polyester resins include copoly(1,3-propylene-succinate)-copoly(1,2-proplyene-succinate), copoly(1,4-butylene-succinate)-copoly(1,2-proplyene-succinate), copoly(1,3-propylene-sebacate)-copoly(1,2-proplyene-sebacate), copoly(1,3-propylene-dodecanoate)-copoly(1,2-proplyene-dodecanoate), copoly(1,3-propylene-azeleoate)-copoly(1,2-proplyene-azeleoate), and the like, and mixtures thereof.

More specifically, the semi-crystalline polyester resins have a melting point of less than about 50° C., such as from about 10° C. to about 49° C., less than from about 70° C., and from about 40° C. to about 60° C.

The semi-crystalline resins with excellent melting points can be prepared from a mixture of at least one straight chain aliphatic organic diacid, at least one straight chain aliphatic diol, and a branched aliphatic diol, such as 1,2-propanediol, 1,3-butanediol, 2,3-butanediol, 3,3-dimethyl-pentanediol mixture thereof, and the like. The organic diacid of at least one aliphatic straight chain organic diacid is selected in an amount of, for example, from about 45 to about 50 percent by weight of the polyester resin. The straight chain aliphatic diol is selected in an amount of, for example, from about 20 percent by weight to about 40 percent by weight of the polyester resin, and the branched aliphatic diol is selected in an amount of, for example, from about 20 to about 40 percent by weight of the polyester resin. These polyester resins include copoly(1,3-propylene-succinate)-copoly(1,2-proplyene-succinate), copoly(1,4-butylene-succinate)-copoly(1,2-proplyene-succinate), copoly(1,3-propylene-sebacate)-copoly(1,2-proplyene-sebacate), copoly(1,3-propylene-dodecanoate)-copoly(1,2-proplyene-dodecanoate), copoly(1,3-propylene-azeleoate)-copoly(1,2-proplyene-azeleoate), and the like, and mixtures thereof.

Amorphous polyester resin examples selected for the preparation of the polyurethane elastomers usually do not possess a melting point and can have a glass transition temperature of, for example, from about −25° C. to about 10° C., and can be prepared from a mixture of at least one or more straight chain aliphatic diacids, branched aliphatic diols with optionally one or more straight chain aliphatic diols. The straight chain aliphatic diol is selected in an amount of, for example, from about 45 to about 50 percent by weight of the polyester resin, and the branched aliphatic diol is selected in an amount of, for example, from about 30 to about 55 percent by weight of the polyester resin, and the optionally one or more straight chain aliphatic diols is selected in an amount of, for example, from about 0 to about 20 percent by weight of the polyester resin. These amorphous polyester resins include copoly(1,2-propylene-succinate)-copoly(1,2-proplyene-sebacate), copoly(1,2-propylene-succinate)-copoly(1,2-proplyene-dodecanoate), copoly(1,2-propylene-sebacate)-copoly(1,2-proplyene-dodecanoate), copoly(1,2-propylene-dodecanoate)-copoly(1,2-proplyene-azeloate), copoly(1,2-propylene-azeleoate)-copoly(1,2-proplyene-succinate), poly(butylene-succinate), poly(butylene-2,5-furanate), poly(butylene-itaconate), poly(propylene-succinate), poly(propylene-2,5-furanate), poly(propylene-itaconate), and the like, and mixtures thereof.

The amorphous polyester, the semi-crystalline polyester, and mixtures thereof can be present in the polyurethane elastomer in amounts of, for example, percent by weight of from about 1 to about 99, from about 10 to about 85, from about 18 to about 75, from about 25 to about 65, from about 30 to about 55, and from about 40 to about 60 percent by weight based on the polyurethane elastomer weight.

Plasticizers

The plasticizer is selected, for example, from tributyl-citrate, CITROFOL® available from Jungbunzlauer, Hallstar IM 8830, an ester available from Hallstar, triethyl-citrate; trimethyl-citrate, adipates such as EDENOL® 650R available from Emery Olechemicals, tributyl citrate, alkyl aryl phthalates, alkyl benzyl phthalates, including butyl benzyl phthalate, alkyl benzyl phthalate, and wherein the alkyl group has a carbon chain of from seven to nine carbon atoms, TEXANOL™, benzyl phthalate, (2,2,4-trimethyl-1,3-pentanediol-monobutyrate benzyl phthalate), alkylphenyl phthalate, symmetrical and unsymmetrical dialkyl phthalates, including diisononyl phthalate, diisodecyl phthalate, dioctyl phthalate, di-n-butyl phthalate, dioctyl phthalate, dihexyl phthalate, diheptyl phthalate, butyloctyl phthalate, linear dialkyl phthalate, wherein the alkyl groups are independently carbon chains having from about seven to about eleven carbon atoms, and butyl cyclohexyl phthalate; phosphate plasticizers, such as tris-(2-chloro-1-methylethyl) phosphate, tris-(alpha-chloroethyl)phosphate (TCEP), tris-(2,3-dichloro-1-propyl)phosphate, YOKE-V6 (tetrakis-(2-chloroethyl)dichloroisopentyldiphosphate), and the like; phosphate ester plasticizers, such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate, and isopropylated triphenyl phosphate; and benzoate plasticizers, such as, for example, TEXANOL™ benzoate (which is 2,2,4-trimethyl-1,3-pentanediol-monobutyrate benzoate), glycol benzoate, propylene glycol dibenzoate, dipropylene glycol is dibenzoate, and tripropylene glycol dibenzoates, in amounts of, for example, from about 1 percent by weight to about 30 percent by weight, and from about 1 percent by weight to about 15 percent by weight based on the amount of the polyurethane elastomer, and other known suitable plasticizers.

Crosslinkers

The crosslinker is, for example, selected from diethanolamine, glycerol, trimethylol propane, pentaerythritol, 1,2,4-butanetriol, thioglycolic acid, 2,6-dihydroxybenzoic acid, melamine, diglycolamine, 1,2,6-hexanetriol, glycerol, 1,1,1-trimethylolethane, 1,1,1-trimethylolpropane (TMP), pentaerythritol, triisopropanol amine, triethanol amine, tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, and glycerol, and especially polyols, such as trimethylolpropane, pentaerythritol, and glycerol, and bio-based materials thereof, present in amounts of, for example, from about 0.1 percent by weight to about 10 percent by weight, and from about 0.1 percent by weight to about 5 percent by weight based on the amount of polyurethane elastomer, and other known suitable known crosslinkers.

Chain Extenders

Chain extender examples include alcohols, such as polyhydric alcohols, carboxylic acid derivatives having two functional groups can be selected for the elastomers and processes disclosed herein. More specifically, chain extender examples contain, for example, two hydroxyl moieties such as 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols like ethylene glycol, propylene glycol, monoethylene glycol, diethylene glycol, monopropylene glycol, dipropylene glycol, mixtures thereof, other known suitable chain extenders, and the like, present in amounts of, for example, from about 0.1 percent by weight to about 10 percent by weight, from about 0.1 percent by weight to about 5 percent by weight based on the polyurethane elastomer, and other known suitable known chain extenders.

Surfactants

The surfactants that can be selected are, for example, polyether-silicone oil mix (TEGOSTAB® B4113) available from Evonik, 8383, silicone surfactant DABCO DC® 193, and TEGOSTAB® B8383 available from Evonik, sodium dodecylbenzene sulfonate, sodium dodecylnaphthalene sulfate, dialkylbenzenealkyl, sulfates and sulfonates, adipic acid, available from Aldrich, NEOGEN R™, NEOGEN SC™, available from Daiichi Kogyo Seiyaku, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy-poly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, ANTAROX890™, and ANTAROX897™, and other suitable known surfactants in amounts of, for example, from about 0.1 percent by weight to about 10 percent by weight, and from about 0.1 percent by weight to about 3 percent by weight based on the polyurethane elastomer amount.

Catalysts

Polycondensation catalysts utilized for the preparation of the crystalline and amorphous polyesters, include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), other suitable known catalysts or mixtures thereof; and which catalysts are selected in amounts of, for example, from about 0.01 percent by weight to about 5 percent by weight, from about 0.1 to about 0.8 percent by weight, and from about 0.2 to about 0.6 percent by weight, and other suitable, percentages, based on the starting diacid or diester used to generate the polyester.

Examples of catalysts selected for the preparation of the polyurethane elastomers, and which catalysts can react with the organic diisocyanates include, for example, known tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, DAPCO 33 LV (33 percent triethylenediamine dissolved in 67 percent dipropylene glycol), BICAT 8109 (bismuth neodecanoate), Jeffcat-Zf-54 (bis-(2-dimethylaminoethyl)ether in dipropylene glycol), KOSMOS® 75 MEG, and the like; organometallic compounds, such as titanic esters, iron compounds, tin compounds, such as tin diacetate, tin dioctoate, tin dilaurate, the dialkyl tin salts of aliphatic carboxylic acids like dibutyltin diacetate and dibutyltin dilaurate, other suitable catalysts and the like. The total amount of catalysts selected is generally from about 0.1 percent by weight to about 5 percent by weight, and more specifically, from about 0.1 to about 1 percent by weight, based on the polyurethane elastomer.

Colorants

Colorant examples that can be selected for the preparation of the polyurethane elastomer compositions present, for example, in amounts of from about 0.1 percent by weight to about 5 percent by weight, and from about 0.1 percent by weight to about 3 percent by weight based on the amount of the polyurethane elastomer, include pigments, dyes, mixtures thereof, and the like. Examples of colorants include dyes and pigments include inorganic pigments, such as carbon black, whiteners, such as titanium oxide which has weather resistance, and organic pigments and dyes, such as phthalocyanine blue, azo dyes, Indigo, Congo Red, Methyl Orange, Malachile Green, purple dyes, brown dyes, black dyes, Pigment Blue 15:3 or C.I. Pigment Blue 15:4, phthalocyanine green, quinacridone red, indanthrene orange, and isoindolinone yellow, C.I. Pigment Red 254 and C.I. Pigment Red 122, C.I. Pigment Yellow 151 and C.I. Pigment Yellow 74, Fates Dye and Keen Dye available from BAO Shen Polyurethane Tech.LTD-China, purple dyes, brown dyes, and other suitable known colorants, such as known dyes and pigments illustrated in the Colour Index (C.I.), and magenta, yellow, and cyan colorants.

Foaming Agents

There is selected as the foaming (or blowing) agent water and other suitable known blowing agents present in the reaction mixture and in the flexible polyurethane foams thereof, and which increases the firmness of the resulting foams. A soft, flexible, plasticized water-blown polyurethane foam composition can be produced from the reaction of a natural polyol and methylene diphenyl diisocyanate, (MDI) or an equivalent isocyanate, and by optionally adding a plasticizer.

Specific examples of foaming agents include water, compressed gases, such as $CO_2$, $N_2$, air or low boiling liquids like cyclopentane, pentane, isobutane and hydrofluorocarbons, added in amounts of from about 0.5 percent by weight to about 3 percent by weight of the polyurethane elastomer. Also, for example, $CO_2$ may be generated in-situ by the decomposition of $NaHCO_3$ or the reaction of water with isocyanate and other known suitable foaming agents.

Organic Diisocyanates

Examples of organic diisocyanates selected for the compositions and processes illustrated herein include aliphatic diisocyanates, such as hexamethylene diisocyanate, cycloaliphatic diisocyanates, such as isophorone diisocyanate, cyclohexane 1,4-diisocyanate, 1-methylcyclohexane 2,4-diisocyanate, and 1-methylcyclohexane 2,6-diisocyanate, and the corresponding isomer mixtures, dicyclohexylmethane 4,4'-diisocyanate, dicyclohexylmethane 2,4'-diisocyanate, dicyclohexylmethane 2,2'-diisocyanate, and the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. Especially selected diisocyanates are hexamethylene 1,6-diisocyanate, cyclohexane 1,4-diisocyanate, isophorone diisocyanate, dicyclohexylmethane diisocyanate, diphenylmethane diisocyanates with more than 96 percent by weight content of diphenylmethane 4,4'-diisocyanate, diphenylmethane 4,4'-diisocyanate, and naphthylene 1,5-diisocyanate, suitable known diisocyanates, and mixtures thereof, and the like, and other known suitable organic diisocyanates.

In embodiments, there can be selected mixtures of a diisocyanate and a polyisocyanate in an amount of up to about 15 percent by weight, based on the total diisocyanates present, however, up to about 40 percent by weight of polyisocyanate can be added, and that provides an improved thermoplastically processable product. Examples of polyisocyanates include triisocyanates, biurets and isocyanurate trimer. For example, triphenylmethane 4,4',4"-triisocyanate and polyphenylpolymethylene polyisocyanates as well as hexamethylene diisocyanate (HDI) biuret trimer, isocyanurate trimer, and isophorone (IPDI) isocyanurate trimer.

Generally, for the polyurethane plasticizer foam preparation in embodiments and the appropriate Examples that follow, the active reactant components of, for example, the polyester resin, the crosslinker, the chain extender, and the foaming agent, and the non-reactive components of, for example, the bio-additives disclosed, for example, in the copending application Ser. No. 17/015,669 being filed concurrently herewith, the disclosure of which is totally incorporated herein by reference, colorant, plasticizer, and surfactant, are initially admixed followed by the addition of the organic diisocyanate and heating. Further, the disclosed polyurethane elastomer foams have excellent bio-contents originating, for example, from the polyester polyol, the plasticizer, and the chain extender.

The characteristics and properties of the polyurethane products can be measured as illustrated herein, and by known processes and devices. More specifically, there was selected as a tensile tester, the ADMET eXpert 7601 Tensile Tester, to measure tensile strength, elongation, tear strength and compression set, by preparing a sample of the polyurethane composition foam material compositions in dog bone shapes with a die cutter with a standard thickness of about 10 millimeters and a length of about 140 millimeters based on ASTM D412, ASTM D3574-17, SATRA TM-2 standards. The sample removed was placed between clamps and where the tensile tester applies the appropriate force at a particular speed (generated by the software) on the test material sample to provide the characteristics, properties and values of the polyurethane products.

Density was measured using the equation Density=Mass/Volume, where mass represents the mass of the material in a mold measured on an analytical balance. Volume of the mold was obtained from the dimensions of the mold. For example, if a mold was producing 10 millimeters, or 1 centimeter polyurethane foam plaques with dimensions length equal to 21 centimeters with width equal to 14.8 centimeters, and the thickness equal to 10 millimeters, then the volume was calculated to be 21 times 14.8 times 1 equals 310.80 centimeters$^3$.

The hardness was measured on the Asker C scale, and can also be measured by a durometer.

The bio-content of the disclosed polyurethane elastomer foams can be determined by various methods. In one method, the bio-content can be measured as follows and where, for example, the polyester polyol, plasticizer, and chain extender can also impart bio-content characteristics to the polyurethane elastomer foams.

Add the total weight of the components/
ingredients=$X$ grams

Add the weight of the components ingredients that
are bio-based, the polyester resin plus the chain
extender plus the plasticizer=$Y$ grams Total bio-content=($Y/X$)×100=the bio-content in percent.

More specifically, for example, when 100 grams of the polyester resin are selected and 5 percent by weight of the bio-additive/filler is added, then based on the polyester resin, the amount of the bio additive-based filler is 100×0.05=5 grams.

Total weight of ingredients including the bio-filler=$Z$
grams

Weight of the bio-based ingredients, which also
includes the bio additive-filler=$W$ grams New bio-content=($W/Z$)×100=$N$ $N$ represents the
new bio-content with the biocide additive, or
where the bio-content can be derived from the
polyol polyester, the plasticizer and the chain
extender.

Based on the above disclosed calculation, 1 percent by weight of the bio additive-filler will increase the bio-content by 0.1 percent; 2.5 percent by weight bio additive-filler will increase the bio-content by 0.3 percent; 5.0 percent by weight of the bio additive-filler will increase the bio-content by 0.7 percent; and 10.0 percent of the bio additive-filler will increase the bio-content by 1.3 percent. Thus, based on the bio-content of the ingredients present in the polyurethane foam formulations, the bio-content for the polyurethane elastomer foam is, for example, from about 60 percent to about 90 percent, from about 50 percent to about 90 percent, from about 65 percent to about 85 percent, from about 40 percent to about 85 percent, from about 70 percent to about 85 percent, and from about 60 percent to about 80 percent.

Specific embodiments of the present disclosure as illustrated in the following Examples are for illustrative purposes and are not limited to the materials, conditions, or process parameters set forth in these embodiments. Percent by weight is a known quantity and is usually based on the total of the components present. Molecular weights were provided by the sources involved, or by GPC, and from about to about includes all the values in between and some values that exceed or may not exceed the values disclosed. Also, the components of (a) to (h) can be mixed in various sequences to obtain the polyurethane elastomers and the polyurethane foams, both of which can be biodegradable. The viscosities were measured by the Brookfield CAP2000 Viscometer.

Example 1

Preparation of the semipolyester resin, poly(1,3-propylene-succinate), generated from 1,3-propanediol and succinic acid, and with a resin melting point of 49.3° C., as determined by DSC.

To a 300 milliliter three-necked round bottom flask equipped with a mechanical stirrer were added 169 grams of succinic acid, 137 grams of 1,3-propanediol and 0.1 gram of titanium (iv) isopropoxide (Tyzor TE) catalyst. The reaction mixture was kept under constant nitrogen flow of about 5 standard cubic feet per minute (scfm) and heated to 140° C. over 30 minutes. The mixture obtained was then stirred at 200 rpm, and the temperature was increased by 10° C. every 15 minutes until the temperature reached 200° C. Samples, about 2 grams each, were removed every 20 minutes using a glass pipette, and when a viscosity of about 5180 centipoise was obtained, as measured by the Brookfield CAP2000 Viscometer at 80° C. and a spindle rate of 100 rpm, there followed discharging the resin mixture into a metal pan. The acid value of the obtained resin was 1.09 milligram/gram of KOH, measured by dissolving a sample in tetrahydrofuran containing phenolphthalein indicator, and subsequently titrating with a 0.1 N potassium hydroxide solution in ethanol. The melting point of the semipolyester resin, poly(1,3-propylene-succinate) product was determined to be 49.3° C. using a DuPont 910 Differential Scanning calorimetry (DSC) with a heating rate of 20° C./minute on the second scan, and taking the peak value of the melting point transition curve.

Example 2

Preparation of the semi-crystalline polyester resin poly(1,3-propylene-succinate) with a melting point of 49.1° C. as measured by DSC was prepared from 1,3-propanediol and succinic acid.

To a 300 milliliter three-necked round bottom flask equipped with a mechanical stirrer were added 155 grams of succinic acid, 130 grams of 1,3-propanediol and 0.1 gram of titanium (iv) isopropoxide (Tyzor TE) catalyst. The reaction mixture was kept under constant nitrogen flow of about 5 standard cubic feet per minute (scfm) and then heated to 140° C. over 30 minutes. The mixture resulting was then stirred at 200 rpm, and the temperature was increased by 10° C. every 15 minutes until the temperature reached 200° C. Samples of the resin, about 2 grams each, were taken every 20 minutes using a glass pipette, and when a viscosity of about 3750 centipoises was obtained, the resin mixture was discharged into a metal pan. The acid value of the obtained polyester was 0.93 milligram/gram of KOH.

Example 3

Preparation of a semi crystalline polyester resin, copoly (1,3-propylene-succinate)-copoly(1,2-propylene-succinate), from succinic acid, 1,3-propanediol, 1,2-propanediol, and wherein the molar ratio of 1,3-propanediol to 1,2-propanediol was 7.67.

To a 300 milliliter three-necked round bottom flask equipped with a mechanical stirrer were added 155 grams of succinic acid, 115 grams of 1,3-propanediol, 15 grams of 1,2-propanediol, and 0.1 gram of titanium (iv) isopropoxide (Tyzor TE) catalyst. The reaction mixture was kept under constant nitrogen flow of about 5 standard cubic feet per minute (scfm) and heated to 140° C. over 30 minutes. The mixture obtained was then stirred at 200 rpm, and the temperature was increased by 10° C. every 15 minutes until the temperature reached 200° C. Samples of the resin, about 2 grams each, were then taken with a glass pipette every 20 minutes and when a viscosity of about 3735 centipoise was obtained, the resulting resin mixture was discharged into a metal pan. The acid value of the semi-crystalline polyester obtained was 1.88 milligrams/gram of KOH, and the melting point thereof of this resin was determined to be 43.9° C. as determined by DSC.

Example 4

Preparation of the semi crystalline polyester resin derived from succinic acid, 1,12-dodecanedioic acid, 1,3-propanediol, 1,2-propanediol, and wherein the molar ratio of 1,3-propanediol to 1,2-propanediol is 3, and the molar ratio of succinic acid to 1,12-dodecanedioic acid was 1.

To a 300 milliliter three-necked round bottom flask equipped with a mechanical stirrer were added 77.5 grams of succinic acid, 151.1 grams of 1,12-dodecanedioic acid, 115 grams of 1,3-propanediol, 15 grams of 1,2-propanediol, and 0.1 gram of titanium (iv) isopropoxide (Tyzor TE) catalyst. The reaction mixture was kept under constant nitrogen flow of about 5 standard cubic feet per minute (scfm) and heated to 140° C. over 30 minutes. The mixture obtained was then stirred at 200 rpm, and the temperature was increased by 10° C. every 15 minutes until the temperature reached 200° C. Samples of the resin, about 2 grams for each sample, were taken every 20 minutes using a glass pipette, and when a viscosity of about 4310 centipoises was obtained, the resin mixture was discharged into a metal pan. The acid value obtained for the resulting semi crystalline polyester was 2.54 milligrams/gram of KOH, and the melting point for this resin was determined to be 37.8° C. as measured by DSC.

Example 5

Preparation of the polyester resin derived from succinic acid, sebacic acid, 1,3-propanediol, 1,2-propanediol, and wherein the molar ratio of 1,3-propanediol to 1,2-propanediol is 7.67, and the molar ratio of succinic acid to sebacic acid is 1.

To a 300 milliliter three-necked round bottom flask equipped with a mechanical stirrer are added 77.5 grams of succinic acid, 132.7 grams of sebacic acid (bio-based), 115 grams of 1,3-propanediol, 15 grams of 1,2-propanediol and 0.1 gram of titanium (iv) isopropoxide (Tyzor TE) catalyst. The reaction mixture resulting is kept under constant nitrogen flow of about 5 standard cubic feet per minute (scfm) and is heated to 140° C. over 30 minutes. The mixture is then stirred at 200 rpm, and the temperature is increased by 10° C. every 15 minutes until a temperature of 200° C. is reached. Samples of the resin, about 2 grams each, are then taken every 20 minutes with a glass pipette, and when a viscosity of about 4300 centipoise is obtained, the resin mixture is discharged into a metal pan.

Example 6

Preparation of a semi-crystalline polyester resin, derived from succinic acid, octadecane-dioc-acid, 1,3-propanediol, 1,2-propanediol, and wherein the molar ratio of 1,3-propanediol to 1,2-propanediol is 7.67, and the molar ratio of succinic acid to octadecane-dioc-acid is 1.

To a 500 milliliter three-necked round bottom flask equipped with a mechanical stirrer were added 77.5 grams of succinic acid, 206.4 grams of octadecane-dioc-acid (available as C-18 Dimer Diacid from Elevance), 115 grams of 1,3-propanediol, 15 grams of 1,2-propanediol, and 0.1 gram of titanium (iv) isopropoxide (Tyzor TE) catalyst. The reaction mixture resulting was kept under constant nitrogen flow of about 5 standard cubic feet per minute (scfm) and heated to 140° C. over 30 minutes. The mixture obtained was then stirred at 200 rpm, and the temperature was increased by 10° C. every 15 minutes until the temperature reached 200° C. Samples of the resin, about 2 grams each, were taken every 20 minutes using a glass pipette, and when a viscosity of about 4110 centipoises was obtained, the resin mixture was discharged into a metal pan. The acid value obtained for the resulting semi-crystalline polyester resin was 1.07 milligram/gram of KOH, and the melting point of this semi-crystalline polyester resin was determined by DSC to be 61.6° C.

Example 7

Preparation of an amorphous polyester resin derived from succinic acid, octadecane-dioc-acid (dimer acid), 1,3-propanediol, 1,2-propanediol, and wherein the molar ratio of 1,3-propanediol to 1,2-propanediol is 1, and the molar ratio of succinic acid to the dimer acid is 1.

To a 500 milliliter three-necked round bottom flask equipped with a mechanical stirrer were added 77.5 grams of succinic acid, 206.4 grams of octadecane-dioc-acid (available as C-18 dimer diacid from Elevance), 60 grams of 1,3-propanediol, 60 grams of 1,2-propanediol, and 0.1 gram of titanium (iv) isopropoxide (Tyzor TE) catalyst. The reaction mixture obtained was kept under constant nitrogen flow of about 5 standard cubic feet per minute (scfm) and heated to 140° C. over 30 minutes. The mixture was then stirred at 200 rpm, and the temperature was increased by 10° C. every 15 minutes until the temperature reached 200° C. Samples of the resin, about 2 grams each, were then taken every 20 minutes using a glass pipette, and when a viscosity of about 4110 centipoises was obtained, the resin mixture was discharged into a metal pan. The acid value obtained for the generated amorphous polyester resin was 1.07 milligrams/gram of KOH. There was no melting point transition indicated by DSC for the obtained amorphous polyester.

Example 8

Preparation of an amorphous polyester resin, derived from succinic acid, dilinoleic diol (DLA-OH), 1,3-propanediol, and 1,2-propanediol.

To a 500 milliliter three-necked round bottom flask equipped with a mechanical stirrer were added 65.88 grams of succinic acid, 78.05 grams of dilinoleic diol (available as C-35 PRIPOL® 2033 Dimer Diol) from Croda Industrial Chemicals), 55.31 grams of 1,3-propanediol, 55.31 grams of 1,2-propanediol and 0.146 gram of titanium (iv) isopropoxide (Tyzor TE) catalyst. The reaction mixture was kept under constant nitrogen flow of about 5 standard cubic feet per minute (scfm) and heated to 155° C. over 30 minutes. The mixture obtained was then stirred at 200 rpm, and the temperature was increased by 10° C. every 15 minutes until temperature reached 195° C. Samples of the resin, about 2 grams each, were then taken every 20 minutes using a glass pipette, and when a viscosity of about 4480 centipoises was obtained, the resin mixture was discharged into a metal pan. The polyester polyol was obtained as a clear transparent viscous liquid that flowed upon cooling to ambient temperature. The acid value obtained for the generated product was 0.5 milligrams/gram of KOH.

Example 9

Insole materials comprised of a polyurethane foam, free rise bun, in open air and not in a mold, to test for the formation of the polyurethane product.

In a 200 milliliter glass container is added 35 grams of the molten (at 70° C.) semi-crystalline polyester resin obtained in Example 1. To this is then added 10.5 grams of the plasticizer tributyl citrate (available from Jungbunzlauer as) CITROFOL®), 0.19 gram of TEGOSTAB® surfactant (available from Evonik), 1.03 gram of the chain extender 1,3-propanediol, 0.37 gram of DABCO LV® catalyst (available from Evonik), 0.32 gram of water, 0.035 gram of diethanolamine crosslinker, available from Evonik as DEOA, 1.24 gram of FATE® dye (available from BAO Shen PolyurethaneTech.LTD-China), and the mixture is then maintained at 50 to 55° C. for 5 minutes, and then homogenized at 1500 rpm for 4 minutes, after which 11.9 milliliters of methylenediphenyl diisocyanate (MDI) (available from Huntsman as Suprasec 2379) is added with a syringe, and the mixture is further homogenized for 5 seconds. The aforementioned mixture is then poured into a cup, and a foam is formed by the reaction of the polyester polyol mixture with MDI isocyanate and generated as a free rise bun. The stable bun is formed with a cream time of about 10 to 12 seconds, a tack free time of about 100 to about 110 seconds, a demold time of 6 minutes, resulting in a density of 0.15 gram/centimeter$^3$, and where the hardness is 17, determined using a durometer, and there is no shrinkage or scorching. After the free rise, the foam is cut into test materials of regular dimension pieces of appropriate length, width and thickness, and the mass is measured by an analytical scale in grams. The density of the resulting free rise foam is determined from the volume estimated from L×W×T (1 centimeter×1 centimeter×4 centimeters=4 centimeters$^3$) following the known standard ASTM D7487-13 methods.

Density equals Mass/Volume for the insole foam, the density of the foam was 0.16+/−1 gram/centimeter$^3$.

As an example, mass equals 0.6432 gram, volume equals 4 centimeters$^3$, hence foam density equals 0.1608.

The test material is placed on a scale, which scale was tared and then a durometer was placed on the test material. A force was applied on the durometer until the scale reads a mass of 2400 grams. This method assures standardization of the force applied on the test material. The hardness is read on the durometer digital scale in Asker C of 17.

Example 10

Insole Polyurethane Foams

An insole foam was first prepared from a footbed. A footbed mold was considered a mold with a cavity of certain design replicating an insole or a midsole of footwear like a shoe. The cavity has a certain volume where the formulation mixture is poured and closed to form the foam product.

A mold, volume 155 millimeters$^3$, was first conditioned by preheating it at 50° C. to 55° C. for 2 hours to primarily ensure equal distribution of temperature. Then, the footbed mold was opened and an insole fabric was attached to the upper part of the mold. A mold release agent EASE RELEASE 2831™, available from Mann Release Technologies, was lightly brushed along the lower part of the mold resulting in a shiny waxy consistency. Forty grams of the semi-crystalline polyester resin of Example 2 was oven melted in a 200 milliliter glass can at 70° C. for 2 hours. To this were added 12 grams of tributyl citrate (available from Jungbunzlauer as CITROFOL®), 0.22 gram of TEGOSTAB® a surfactant (available from Evonik), and 0.37 gram of DABCO LV® catalyst (available from Evonik), 0.324 gram of water, 0.1 gram of diethanolamine as a crosslinker component, and 1.42 grams of FATE® dye (available from BAO Shen Polyurethane Tech.LTD-China). The resulting mixture was then stirred for 4 minutes at 1500 rpm with a homogenizer. While homogenizing, 16.4 milliliters of MDI diisocyanate (available from Huntsman as SUPRASEC™ 2379) was added using a syringe, and the mixture resulting was further homogenized for 5 seconds. The mixture formed was then poured into a footbed mold, which was closed shut and the foam material formed was allowed to cure at a temperature of from about 50° C. to about 55° C. The demold time was 15 to 20 minutes after which the mold was opened, and the foam attached to the fabric was removed and placed on a flat surface. The footbed foam density was calculated from the following equation. Density equals Mass/Volume. The target density was 0.32 hence the mass of material poured into the mold was about 49.6 grams. Volume of the footbed equals 155 centimeters$^3$, mass equals 49.6 grams, density 0.32 gram/centimeter$^3$, hardness 27, assuming no shrinkage.

Examples 11 to 15

Plaques of Polyurethane Insole Foams

The processes of Example 10 were substantially repeated for the preparation of plaques. Plaques foam materials were formed from a rectangular mold with cavity of dimensional volume, V equals length times width times thickness, designated as L×W×T, where L equals 21.0 centimeters, W equals 14.8 centimeters, and T equals Y centimeters. In the following Table 1, Y equals 3 millimeters to 40 millimeters (0.3 centimeter to 4 centimeters) and the appropriate properties, such as volumes, were then determined, and are reported in Table 1.

TABLE 1

| Example Number | Plaque | Mold Volume (cm$^3$) | Density g/cm$^3$ | Tensile Strength MPa | Elongation (%) | Tear Strength N/mm | Compression Set (%) | Resilience (%) |
|---|---|---|---|---|---|---|---|---|
| Example 11 | 3 mm | 93 | 0.35 | 2.57 | 663 | 4.55 | 4.21 | 41.9 |

TABLE 1-continued

| Example Number | Plaque | Mold Volume (cm³) | Density g/cm³ | Tensile Strength MPa | Elongation (%) | Tear Strength N/mm | Compression Set (%) | Resilience (%) |
|---|---|---|---|---|---|---|---|---|
| Example 12 | 6 mm | 186 | 0.30 | 1.79 | 639 | 3.44 | 2.45 | 33.2 |
| Example 13 | 10 mm | 311 | 0.33 | 1.60 | 561 | 2.3 | 1.87 | 42.4 |
| Example 14 | 20 mm | 622 | 0.40 | 1.45 | 348 | 4.92 | 3.39 | 39.0 |
| Example 15 | 40 mm | 878 | 0.737 | 2.56 | 2.34 | 2.34 | 3.34 | 40.0 |

The footbed foam density was calculated by the following equation Density equals Mass/Volume. The calculated density was 0.33 hence the mass of material poured into the mold was about 102.63 grams. The plaques having dimensions, length equals 21 centimeters, width equals 15 centimeters, thickness equals 10 millimeters, were cut into dog-bone type prototypes for mechanical testing. Tensile strength, elongation, and tear strength were measured by a known tensile tester. Compression set was measured by a known compression set tester; resilience was measured by dropping a standard steel ball of known mass from a predetermined height onto a foam and then measuring how high the ball bounces back after hitting the test foam. The rebound was the percentage of the height of rebound divided by the original height the ball was dropped from.

Example 16

Plaques of PU Foam and Hydrolytic Stability

75 Grams of the polyester of Example 3 was melted in a 400 milliliter glass can at 70° C. for 2 hours using an oven. To this was added 22.5 grams of tributyl citrate (available from Jungbunzlauer as CITROFOL®), 0.0.413 gram of TEGOSTAB® surfactant (available from Evonik), 2.198 grams of 1,3 propanediol, 1.2 grams of DABCO DC® catalyst (available from Evonik), 0.75 gram of water, 2.63 grams of FATE® dye (available from BAO Shen Polyurethane Tech.LTD-China), and 0.225 gram of diethanol amine. 1.5 Grams of carbodiimide (available from Stahl as PICASSIAN® XL-725) were then added to the glass can and the mixture resulting was stirred for 4 minutes at 1500 rpm to homogenize. While stirring with a SUPRASEC™ 2379 available from Huntsman, the organic diisocyanate ISO, 30.19 grams, was injected into the SUPRASEC™ 2379 via a pre-weighed syringe. After the syringe was empty the resulting mixture was stirred for a further 5 seconds, and then the obtained mixture was poured into plaque mold with a 10 millimeter thickness. The mold conditions were the same as described in Example 11. The plaque was tested for mechanical properties after cutting it into appropriate dog-bone shapes resulting in a density of 0.33 gram/centimeters³, a hardness of 30, a tensile strength of 1.4 MPa, an elongation of 369 percent, a tear strength of 2.4 Newtons/millimeters², and a resilience of 25 percent.

The above foam was also tested for hydrolytic stability according to the following procedure.

Plastic bottles were filled with distilled water and the above prepared dog-bone shaped foam material was hung using a string ensuring the foam material was completely immersed into the water. The product obtained was then placed in the oven and kept there for 2 weeks while maintaining the temperature in the range of 65° C. to 70° C. After the test period, a sample was removed from the water and dried in the oven at about 70° C. The ratio of mechanical properties after hydrolysis divided by that before hydrolysis should be above about 80 percent for both tensile strength and percent elongation. For the polyurethane plaque of this Example, the stability was found to be 85 percent for tensile strength and 125 percent for elongation.

Example 17

Plaques of PU, Polyurethane Elastomers Foams for Insole Testing

The plaque of foam prepared in Example 16, thickness 10 millimeters (mold volume, 311 centimeters³), was first conditioned by preheating it at 50° C. to 55° C. for 2 hours to ensure equal distribution of the temperature. The mold was then opened, and a mold release agent was lightly brushed along the lower and upper part of the mold resulting in the development of a shiny waxy consistency. Sixty (60) grams of the polyester of Example 1, and 15 grams of the polyester polyol of Example 8, were melted in a 400 milliliter glass can at 70° C. for 2 hours inside an oven. To this was added 22.5 grams of tributyl citrate (available from Jungbunzlauer as CITROFOL®), 0.0.413 gram of TEGOSTAB® surfactant (available from Evonik), 2.198 grams of 1,3-propanediol, 1.2 grams of DABCO LV® catalyst (available from Evonik), 0.75 gram of water, 2.63 grams of FATE® dye (available from BAO Shen Polyurethane Tech.LTD-China), 0.225 gram of diethanolamine, and 1.5 grams of carbodiimide (available from Stahl as PICASSIAN® XL-725). The mixture resulting was then stirred for 4 minutes at 1500 rpm using a homogenizer. To the obtained product and while homogenizing, 19 millimeters of MDI diisocyanate (available from Huntsman as SUPRASEC™ 2379) were added using a syringe, and the mixture obtained was further homogenized for 5 seconds. The mixture resulting was then poured into a mold, which was then closed shut and allowed to cure at a temperature of from about 50° C. to 55° C. The demold time was 15 to 20 minutes after which the mold was opened, and the foam plaque was removed and placed on a flat surface. The plaque was cut into appropriate dog-bone shapes for mechanical testing. The density and hardness were tested according to the procedures illustrated in the preceding Examples resulting in a density: of 0.32 gram/centimeters³, a hardness of 30, a tensile strength of 1.2 MPa, an elongation of 420 percent, a tear strength of 2.2 Newtons/millimeters², and a resilience of 37 percent.

Example 18

Preparation of Midsoles Comprised of Polyurethane Elastomers

A plaque mold, thickness 10 millimeters (mold volume, 311 centimeters³), was first conditioned by preheating at about 50 to 55° C. for 2 hours to ensure equal distribution of temperature. The mold was opened, and a mold release agent was lightly brushed along the lower and upper part of the mold which results in a shiny waxy consistency. Seventy-two (72) grams of polyol PSA 3000 and 8 grams of polyol PSA 2000 blend (available from Bioamber) was melted in a 400 milliliter glass can at 70° C. for 2 hours in an oven. To this was added, 24 grams of plasticizer (available from Jungbunzlauer as CITROFOL®), 0.44 gram of TEGOSTAB® surfactant (available from Evonik), 4 grams of 1,3-propane diol chain extender, 0.24 gram of DABCO LV® catalyst (available from Evonik), 0.16 gram of water, 4 grams of polysaccharide (available as NULVOLVE® from DuPont) were added to the can, and the mixture obtained stirred for 4 minutes at 1500 rpm to homogenize. While stirring, there was injected the diisocyanate ISO MM103 33.55 milliliters via pre-weighed syringe. Once the syringe was empty, the obtained mixture was stirred for a further 5 seconds to homogenize. The mixture obtained was then poured into mold which was closed shut and allowed to cure at the mold temperature. The demold time was 15 to 20 minutes after which the mold was opened, and the foam plaque was removed and placed on a flat surface. The plaques resulting were cut into appropriate dog-bone shapes for mechanical testing, measured as disclosed herein, with the following results. Density 0.433 gram/centimeter$^3$, tensile strength 2.12 MPa, elongation 409 percent, tear strength 3.10 Newtons/millimeters$^2$, and a resilience of 42 percent.

Example 19

Preparation of the Polyurethane Elastomer for Midsoles

A plaque mold, thickness 10 millimeters (mold volume, 311 centimeters$^3$) was first conditioned by preheating at 50° C. to 55° C. for 2 hours to ensure the equal distribution of the temperature. The mold was then opened and a mold release agent was lightly brushed along the lower and upper part of the mold, resulting in a shiny waxy consistency. Polyol PSA 3000, 81.45 grams, and 9.05 grams of polyol PSA 2000 blend was melted in a 400 milliliter glass can at 70° C. for 2 hours in an oven. The six ingredients of Example 18 except with 27.15 grams of plasticizer, 0.50 gram of surfactant, 4.53 grams of chain extender, 0.18 gram of catalyst, 0.14 gram of water, and 4.53 grams of polysaccharide) were added to the can, and the mixture obtained stirred for 4 minutes at 1500 rpm to homogenize. While stirring, there was then injected ISO MM103, 37.07 millimeters by a pre-weighed syringe. Once the syringe was empty, the mixture present was stirred for a further 5 seconds to homogenize. Then, the mixture was poured into mold which was closed shut and allowed to cure at the mold temperature. The demold time was 15 to 20 minutes after which the mold was opened, and the foam plaque was removed and placed on a flat surface. The plaque was cut into appropriate dog-bone shapes for mechanical testing. The density was tested according to the procedures as disclosed herein such as mentioned in the preceding Examples with the following results. Density 0.433 gram/centimeter$^3$, tensile strength 1.87 MPa, elongation 395 percent, tear strength 2.52 Newtons/millimeters, and a resilience of 42 percent.

The claims, as originally presented and as they may be amended, include alternatives, modifications, improvements, equivalents, and substantial equivalents of the disclosed embodiments and teachings, including those that are presently unforeseen, or unappreciated, and that, for example, may arise from applicants/patentees and others. Unless specifically recited in a claim, steps, or components of claims should not be implied, or imported from the specification, or any other claims as to any particular order, number, position, size, shape, angle, color, or material. Percent by weight is a known quantity and is usually based on the total of the components present divided by the specific component present.

What is claimed is:

1. A polyurethane elastomer composition formed by mixing and then reacting a composition comprising (a) an organic diisocyanate, (b) a polyester resin, (c) a chain extender, (d) a crosslinker, (e) a plasticizer, (f) a surfactant, (g) an optional foaming agent, and (h) an optional colorant, and a bio-additive and wherein said elastomer has a hardness value of from about 15 Asker C to about 60 Asker C, a tensile strength of from about 1 MPa to about 10 MPa, a resilience of from about 25 percent to about 60 percent, an elongation at break of from about 150 percent to 700 percent, and a tear strength of from 2 Newtons/millimeters to about 4 Newtons/millimeters, and wherein said polyester is a semi-crystalline polyester selected from the group consisting of poly(1,3-propylene-succinate), and copoly(1,3-propylene-succinate)-copoly(1,2-propylene-succinate).

2. The polyurethane elastomer in accordance with claim 1 wherein the bio-content of the polyurethane elastomer is from about 50 percent to about 90 percent, and further including a catalyst, and wherein the amount of bio-additive is from 1 percent by weight to 10 percent by weight.

3. The polyurethane elastomer in accordance with claim 1 in the configuration of a foam, wherein the foaming agent is present, and the bio-content of the polyurethane elastomer foam is from about 70 percent to about 85 percent, and further including a catalyst.

4. The polyurethane elastomer in accordance with claim 1 wherein the melting point of said semi-crystalline resin is from about 40 degrees Centigrade to about 49 degrees Centigrade.

5. The polyurethane elastomer in accordance with claim 1, wherein the foaming agent is present, and wherein said organic diisocyanate is selected from the group consisting of diphenylmethane 4,4'-diisocyanate, isophorone diisocyanate, dicyclohexylmethane 4,4-diisocyanate, hexamethylene 1,6-diisocyanate, naphthalene 1,5-diisocyanate, and mixtures thereof, wherein said bio-additive is present in an amount of from 1 percent by weight to 10 percent by weight and further including a catalyst.

6. The polyurethane elastomer in accordance with claim 1 wherein said organic diisocyanate is methylenediphenyl diisocyanate.

7. The polyurethane elastomer in accordance with claim 1 wherein said plasticizer is selected from the group consisting of tributyl-citrate, triethyl-citrate trimethyl-citrate, and an adipate.

8. The polyurethane elastomer in accordance with claim 1 wherein said surfactant is selected from the group consisting of a polyether-silicone oil, sodium dodecylbenzene sulfonate, sodium dodecylnaphthalene sulfate, adipic acid, polyvinyl alcohol, polyacrylic acid, methalose, methyl cellulose, and ethyl cellulose.

9. The polyurethane elastomer in accordance with claim 1 wherein said chain extender is selected from the group consisting of polyhydric alcohols, alkylene diols and alkylene glycols, and further including a catalyst.

10. The polyurethane elastomer in accordance with claim 1 wherein said crosslinker is selected from the group consisting of diethanolamine, glycerol, trimethylol propane, pentaerythritol, 1,2,4-butanetriol, thioglycolic acid, 2,6-dihydroxybenzoic acid, melamine, and mixtures thereof.

11. The polyurethane elastomer in accordance with claim 1 in the configuration of a foam, wherein said colorant is a dye present in an amount of from about 0.5 percent by weight to about 5 percent by weight, said bio-additive is present in an amount of from 1 percent by weight to 5 percent by weight and wherein the foaming agent is present.

12. The polyurethane elastomer in accordance with claim 1 wherein said foaming agent is present, said elastomer possesses a hydrolytic stability of from about 80 percent to about 150 percent, possesses a resilience of from about 35 percent to about 60 percent, and has a compression set of from about 3 percent to about 6 percent.

13. The polyurethane elastomer in accordance with claim 1 wherein said plasticizer is tributyl citrate, said crosslinker is an amine, said chain extender is a propane diol, said foaming agent is present and is water or carbon dioxide, and said colorant is present and is comprised of a dye or a pigment.

14. The polyurethane elastomer in accordance with claim 1 in the configuration of a foam, wherein said bio-additive is present in an amount of from 1 percent by weight to 10 percent by weight and wherein said colorant is present in an amount of from about 0.5 percent by weight to about 5 percent by weight, and is comprised of a dye of black, cyan, magenta, yellow, green, red, orange, blue, white, purple or mixtures thereof; and wherein said foaming agent is present and is comprised of carbon dioxide or water.

15. The polyurethane elastomer composition in accordance with claim 1 wherein said polyester is poly(1,3-propylene-succinate), said plasticizer is tributyl citrate, said surfactant is a silicone component, and said organic diisocyanate is methylenediphenyl diisocyanate, said chain extender is 1,3-propanediol, said crosslinker is diethanolamine, said colorant is present, and is comprised of a dye.

16. The polyurethane elastomer composition in accordance with claim 1 wherein said polyester is poly(1,3-propylene-succinate), said organic diisocyanate is methylenediphenyl diisocyanate, said colorant is present, and is comprised of a component selected from the group consisting of a dye and a pigment, and said foaming agent is present.

17. An article of manufacture comprising a polyurethane elastomer composition, said polyurethane elastomer composition is formed by mixing and then reacting a composition comprising (a) an organic diisocyanate, (b) a polyester resin, (c) a chain extender, (d) a crosslinker, (e) a plasticizer, (f) a surfactant, (g) an optional foaming agent, (h) an optional colorant, a bio-additive and an optional catalyst; and wherein said elastomer has a hardness value of from about 20 Asker C to about 60 Asker C, a tensile strength of from about 1 MPa to about 10 MPa, a resilience of from about 25 percent to about 60 percent, an elongation at break of from about 150 percent to 700 percent, and a tear strength of from about 2 Newtons/millimeters to about 4 Newtons/millimeters, and wherein said polyester is a semi-crystalline polyester selected from the group consisting of poly(1,3-propylene-succinate), and copoly(1,3-propylene-succinate)-copoly(1,2-propylene-succinate).

18. The article in accordance with claim 17 wherein said elastomer is an insole, a midsole, or a combination thereof, and said Asker C is from about 15 to about 40 Asker C, and said tensile strength is from about 2 MPa to about 3 MPa.

19. The article in accordance with claim 17 wherein said colorant is present and is comprised of a dye, a pigment, or mixtures thereof, and said foaming agent is present and is comprised of water.

20. The article in accordance with claim 17 wherein said plasticizer is tributyl citrate, said crosslinker is an diethanolamine, said chain extender is a propane diol, said foaming agent is present and is comprised of water or carbon dioxide, and said colorant is present and is comprised of a dye or a pigment.

21. A process for the preparation of polyurethane elastomers comprising mixing of and then reacting (a) an organic diisocyanate, (b) a polyester resin, (c) a chain extender, (d) a crosslinker, (e) a plasticizer, (f) a surfactant, (g) a foaming agent, and (h) an optional colorant and a bio-additive; and wherein said elastomer has a hardness value of from about 15 Asker C to about 60 Asker C, a tensile strength of from about 1 MPa to about 10 MPa, a resilience of from about 30 percent to about 60 percent, an elongation at break of from about 150 percent to 700 percent, and a tear strength of from 2 Newtons/millimeters to about 4 Newtons/millimeters, and wherein said polyester is a semi-crystalline polyester selected from the group consisting of poly(1,3-propylene-succinate), and copoly(1,3-propylene-succinate)-copoly(1,2-propylene-succinate).

22. The process in accordance with claim 21 wherein said bio-additive is present in an amount of from 1 percent by weight to 10 percent by weight, where the polyurethane elastomer is an insole, a midsole, or a combination thereof, and optionally is a foam having a density of from about 0.25 gram/centimeter$^3$ to about 0.55 gram/centimeter$^3$, a bio-content of from about 70 to about 90 percent, and a compression set of from about 3 percent to about 6 percent and an elongation at break of from about 300 percent to 650 percent.

* * * * *